United States Patent [19]
Lyons et al.

[11] Patent Number: 5,831,690
[45] Date of Patent: Nov. 3, 1998

[54] APPARATUS FOR FORMATTING A PACKETIZED DIGITAL DATASTREAM SUITABLE FOR CONVEYING TELEVISION INFORMATION

[75] Inventors: Paul Wallace Lyons, New Egypt, N.J.; Alfonse Anthony Acampora, Staten Island, N.Y.

[73] Assignee: RCA Thomson Licensing Corporation, Princeton, N.J.

[21] Appl. No.: 750,441

[22] Filed: Dec. 6, 1996

[51] Int. Cl.⁶ .............................. H04N 7/04; H04N 7/12
[52] U.S. Cl. ...................... 348/845.2; 348/423; 348/469
[58] Field of Search .............................. 348/845.2, 423, 348/469, 467, 461, 463, 465, 390, 426; H04N 7/04, 7/12

[56] References Cited

U.S. PATENT DOCUMENTS

| | | | |
|---|---|---|---|
| 4,949,175 | 8/1990 | Wind | 348/472 |
| 5,038,347 | 8/1991 | Courtois | 370/440 |
| 5,168,356 | 12/1992 | Acampora | 348/409 |
| 5,231,486 | 7/1993 | Acampora | 348/390 |
| 5,241,382 | 8/1993 | Paik | 348/426 |
| 5,289,276 | 2/1994 | Siracusa | 348/469 |

FOREIGN PATENT DOCUMENTS

WO 92/17032
A1  10/1992  WIPO .............................. H04N 7/13

OTHER PUBLICATIONS

Kouji Ohsaki et al., *Transmission Structure of Digital Broadcasting*, SUPERCOMM/ICC '94, May 1994, New Orleans, LA, IEEE 1994, pp. 853–858.

"Kanalcodierung und Modulation für die digitale Fernsehübertragung", Fernseh Und Kinotechnik, vol. 48, No. 3, Mar. 1994, Berlin DE, pp. 109–114.

*Primary Examiner*—Howard Britton
*Attorney, Agent, or Firm*—Joseph S. Tripoli; Eric P. Herrmann; Ronald H. Kurdyla

[57] ABSTRACT

A transmission processor (16) receives an input packetized datastream (FIGS. 6–9; FIGS. 15–18 signal A) containing packets of data bytes including MPEG coded video information. The transmission processor outputs a symbol datastream (FIGS. 15–18 signal F) representing a sequence of data fields (FIG. 1) comprising groups of data segments (X) with an associated field sync segment. The transmission processor inserts overhead information. e.g., FEC error coding information, into each data segment, and inserts the longer duration field sync overhead segment between groups of data field segments. The frequency of the transmission processor input byte clock (SC/2, FIG. 6; FIG. 15) an integer sub-multiple of an output symbol clock (SC) frequency. The input datastream exhibits constant uniform inter-packet data gaps and a constant uniform data rate, thereby facilitating the seamless insertion of the field sync overhead segment into the datastream without interrupting the datastream. Similar but inverse processing occurs at a receiver.

33 Claims, 11 Drawing Sheets

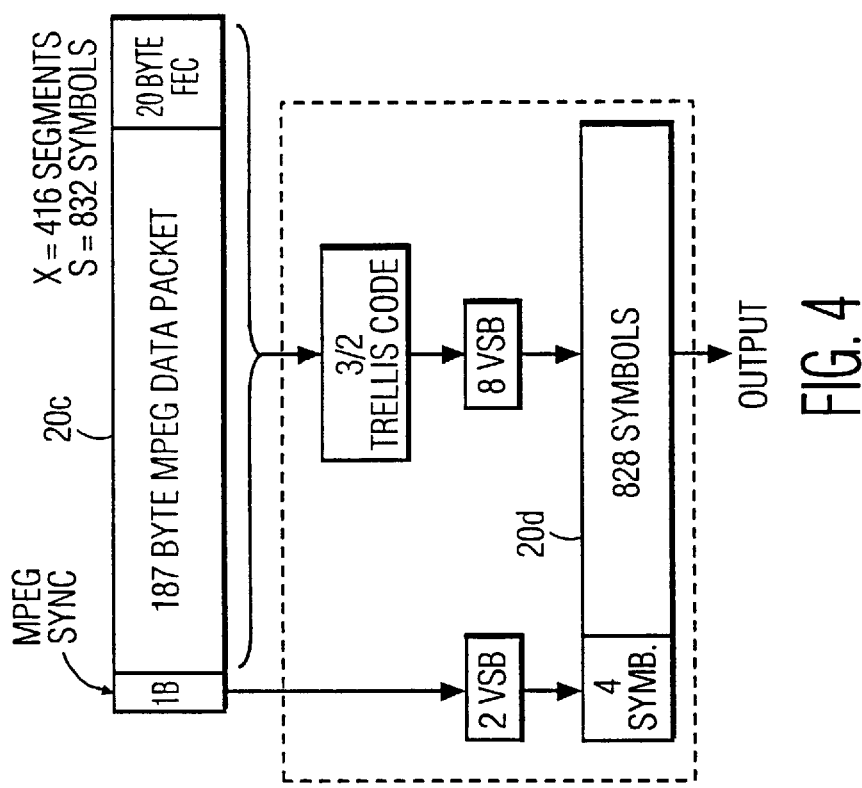
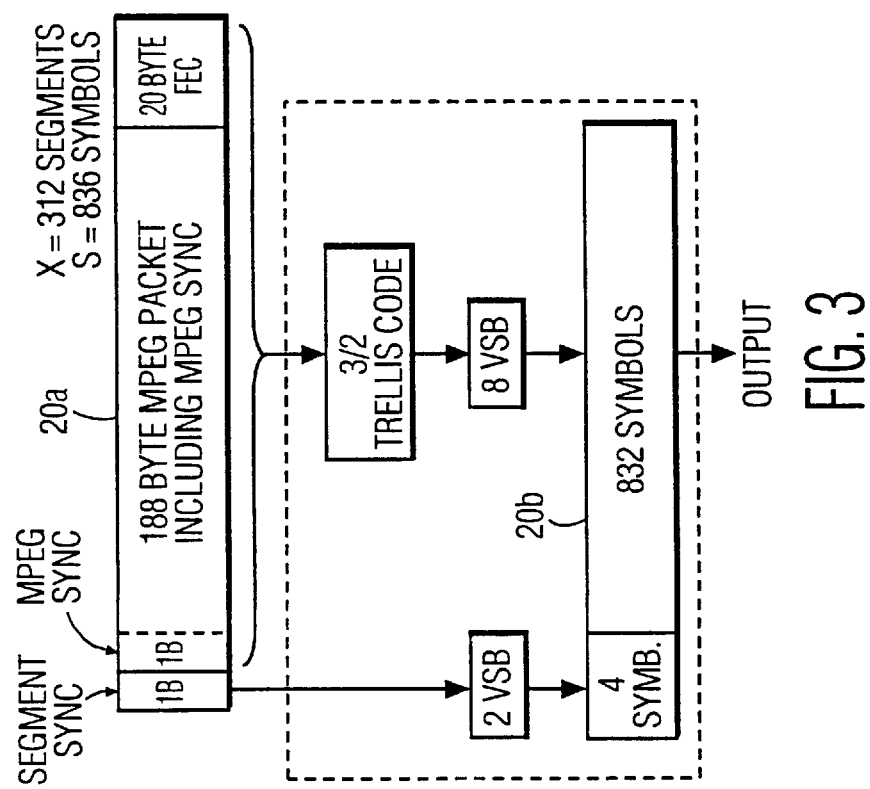

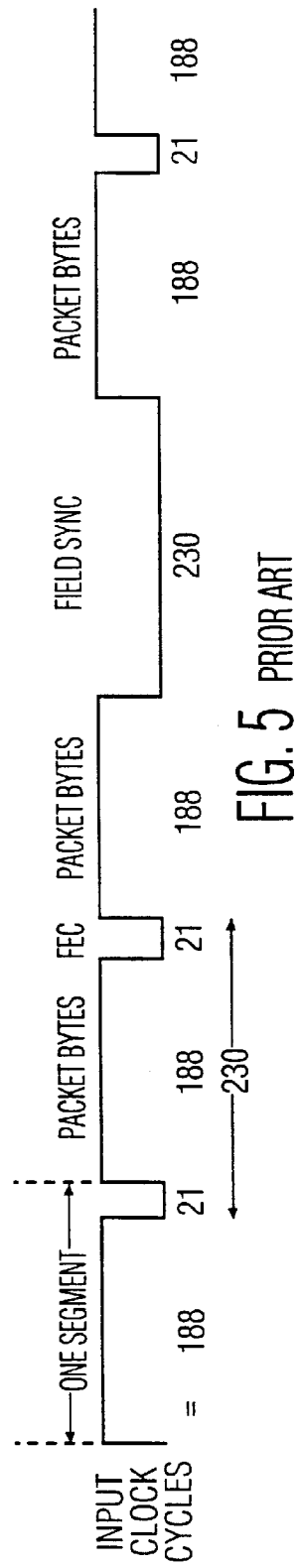
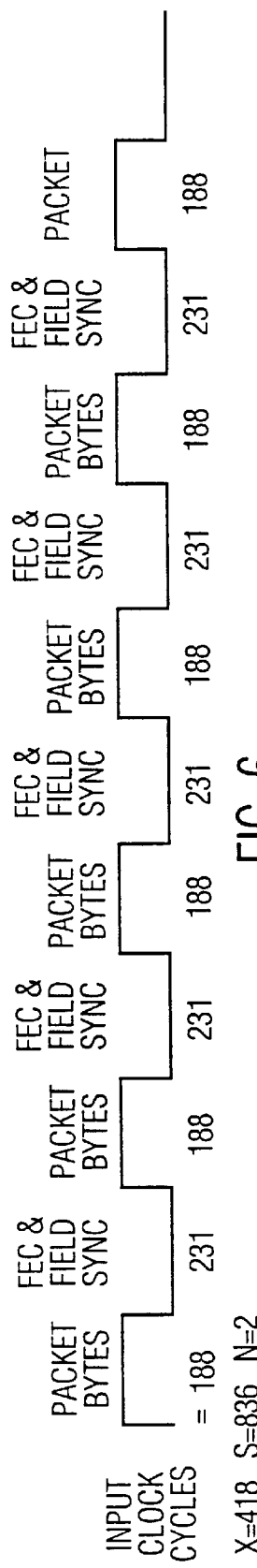
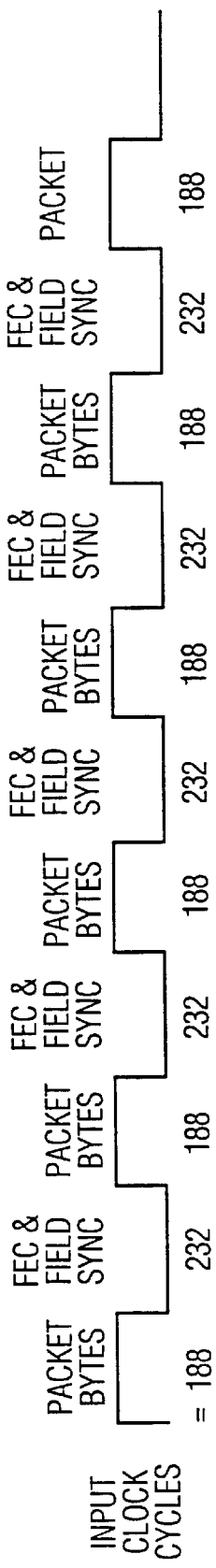

APPARATUS FOR FORMATTING A PACKETIZED DIGITAL DATASTREAM SUITABLE FOR CONVEYING TELEVISION INFORMATION

BACKGROUND OF THE INVENTION

This invention is related to the field of digital signal processing, and more particularly to a system for formatting a sequence of packets in a packetized data stream suitable for use in a high definition television (HDTV) system.

Recent developments in the field of video signal processing have produced digital high definition television signal processing and transmission systems. One such system is described in U.S. Pat. No. 5,168,356-Acampora et al. In that system, a codeword datastream, including codewords provided in accordance with the MPEG data compression standard as is known, are conveyed to a transport processor. A major function of the transport processor is to pack variable length codeword data into packed data words. An accumulation of packed data words, called a data packet or data cell, is prefaced by a header containing information for identifying the associated data words, among other information. Thus an output from the tranport processor is a packetized datastream comprising a sequence of transport packets. The transport packet format enhances the prospects of resynchronization and signal recovery at a receiver, e.g., after a signal disruption which may result from a transmission channel disturbance, by providing header data from which a receiver can determine re-entry points into the datastream upon the occurrence of a loss or corruption of transmitted data.

An HDTV terrestrial broadcast system recently proposed as the Grand Alliance HDTV system in the United States employs a vestigial sideband (VSB) digital transmission format for transmitting a packetized datastream. The Grand Alliance HDTV system is a proposed transmission standard that is under consideration in the United States by the Federal Communications Commission through its Advisory Committee of Advanced Television Service. In this system, the data is arranged as a sequence of data fields. Each field structure includes 313 segments: a field sync segment (which does not contain payload data) followed by 312 data segments. Each data segment includes a data component and a forward error correction (FEC) component. A synchronizing (sync) component is associated with each data segment. A transport processor provides 188 byte fixed length packets of data to a transmission processor, which performs various coding functions on each data packet to produce output symbol segments to be conveyed to an output transmission channel. Each byte comprises a predetermined number of symbols, e.g., 4 symbols. A description of the Grand Alliance HDTV system as submitted to the ACATS Technical Subgroup Feb. 22, 1994 (draft document) is found in the 1994 Proceedings of the National Association of Broadcasters, 48th Annual Broadcast Engineering Conference Proceedings, Mar. 20–24, 1994.

The data packets contain data in conformance with the ISO-MPEG (International Standards Organization-Moving Pictures Experts Group) MPEG-2 data compression standard. The transport processor provides only the data packets to the transmission processor, which adds an overhead FEC error detection and correction component to each segment, and an overhead field sync segment at the beginning of each data field, i.e., between each group of data field segments. The data flow is regulated to perform these operations since, as will be seen, the FEC components and the field sync segment occur at different times and exhibit different durations. Several techniques exist for regulating the data flow to match the output symbol transmission requirements of the data field structure. One technique calculates the payload throughput rate from the output symbol clock frequency and the inserted overhead. This requires that the frequency of the clock used to convey data from the transport processor to the transmission processor be precisely related to the output rate of the data from the transmission processor. This frequency need not have an integer relationship to the symbol clock frequency. When an integer relationship does not exist, a phase locked loop network may be used to maintain desired input and output phase and frequency relationships. However, the use of a phase locked loop network is undesirable since it adds significantly to the cost and complexity of the system.

Another technique is to modulate the data flow from the transport processor to the transmission processor in a burst-like fashion, using a clock derived from the symbol clock. In this case MPEG-2 packets containing 188 bytes of data are input to the transmission processor as a continuous burst, with packets being separated by intervals during which the FEC overhead for each data segment is inserted into the datastream by the transmission processor. However, the packet datastream must be interrupted and delayed for a period of time equal to a segment interval when the longer duration field sync segment, which does not contain a data payload like the other packets, is to be inserted into the datastream. The inventors have recognized that such an interrupted datastream not only undesireably reduces the data throughput rate, but also produces non-uniform intervals between data packets. Such non-uniform inter-packet intervals significantly complicates the signal processing requirements, as will be discussed in connection with FIG. 5.

In particular, the inventors have recognized that an interrupted data stream undesirably complicates the interfacing requirements between the transport processor and the transmission processor, particularly with respect to data synchronization, and between any system for recording the packetized datastream. It is very likely that an HDTV datastream will be subject to recording by either studio or consumer equipment. To satisfy MPEG timing requirements, any recording system must faithfully reproduce the packet timing, including any non-uniform gaps between packets, which must be maintained between the packets as such gaps occurred. This requirement significantly increases the complexity of circuits needed to interface to a recording system. In addition, any such gaps produced by transmission processing must be maintained at a demodulator in a receiver.

The interface between the transport processor and the transmission processor is important in many applications, e.g., television broadcast. In such case the transmission processor will be required to generate and output data fields without interruption once transmission has begun. Television receivers rely on this uninterrupted stream of data fields including field sync segments to maintain synchronization. Any change in the data field rate or structure during broadcast would result in a loss of synchronization at the receiver. A broadcast studio normally will have multiple banks of video tape players pre-programmed to automatically switch to appropriate source material in a timed manner. These tape players output transport packets containing transport stream information. Each tape player synchronizes its output to the flow of data to the transmission processor, which is not permitted to alter its field rate or field structure. Non-uniform gaps in the flow of packets from the transport processor to the transmission processor have the effect of making the transmission data field structure an artifact in the data flow at the interface, which would have both a packet and a data field structure. Each studio recorder would be undesireably required to have complicated interfaces that synchronize the tape output to both the packet and field boundaries. Additional information about the field structure would be required to be passed across the interface, or developed by monitoring the data flow at the interface. The tape interface would contain provision for packet sync detection, field detection and sufficient memory to buffer the data field structure. Additional complications are produced by pre-recorded tapes, and insertion of local programming and commercials. These complications and other difficulties are successfully resolved by a system according to the principles of the present invention.

SUMMARY OF THE INVENTION

The present invention is advantageously employed in the context of a system intended to process a packetized datastream representing a data field structure of the type described above, including information occurring at a non-uniform rate due to, for example, different types of overhead information of different duration. Specifically, a system according to the present invention configures the datastream so to make the data field structure transparent to data processors at an encoder or decoder so that the datastream is processed seamlessly and without interruption.

In a system according to the present invention at a transmitter/encoder for example, a packetized datastream is processed to produce an output datastream representing sequential datafield structures each containing data and overhead information. An input network provides an input datastream comprising data packets separated by inter-packet gaps. An overhead network provides a field overhead information segment having a duration different than the duration of inter-packet gaps within a data field. A transmission processing network responds to the datastream and to the field overhead segment for producing an output datastream representing a sequence of datafield structures each comprising a field overhead segment and a data field containing a group of data segments. The input datastream exhibits constant uniform inter-packet gaps with a constant uniform data rate over a plurality of datafield structures. The uniform inter-packet gaps are dimensioned to facilitate the seamless insertion of overhead information without interrupting the datastream.

In accordance with a feature of the invention at a transmitter/encoder, the data packets are read into the transmission processor in response to an input (byte) clock having a frequency that exhibits an integer relationship to the frequency of an output (symbol) clock.

In a preferred embodiment, an output symbol datastream from the transmission processor represents a sequence of data fields each containing a plurality of MPEG data segments with associated error correction overhead data. Each data field is prefaced by a field sync segment representing overhead information of a different duration. An input byte clock frequency is an even integer sub-multiple of an output symbol clock frequency. Fixed length input data packets encompass a fixed number of input clock cycles, and each packet is separated by a fixed, uniform inter-packet interval encompassing a prescribed number of input clock cycles. The number of clock cycles occurring during inter-packet intervals is a function of factors such as the number of segments in a data field, the number of symbols in a data segment, the duration of each data segment, and the duration of the field sync segment.

BRIEF DESCRIPTION OF THE DRAWINGS

In the drawing:

FIGS. 3 and 4 generally illustrate the processing of alternative forms of FIG. 1 data field segments.

FIG. 5 depicts a packetized datastream having non-uniform intervals between data packets.

FIGS. 6–11 depict packetized datastreams having uniform intervals between data packets in accordance with the principles of the present invention.

DETAILED DESCRIPTION OF THE DRAWINGS

Figure 1:
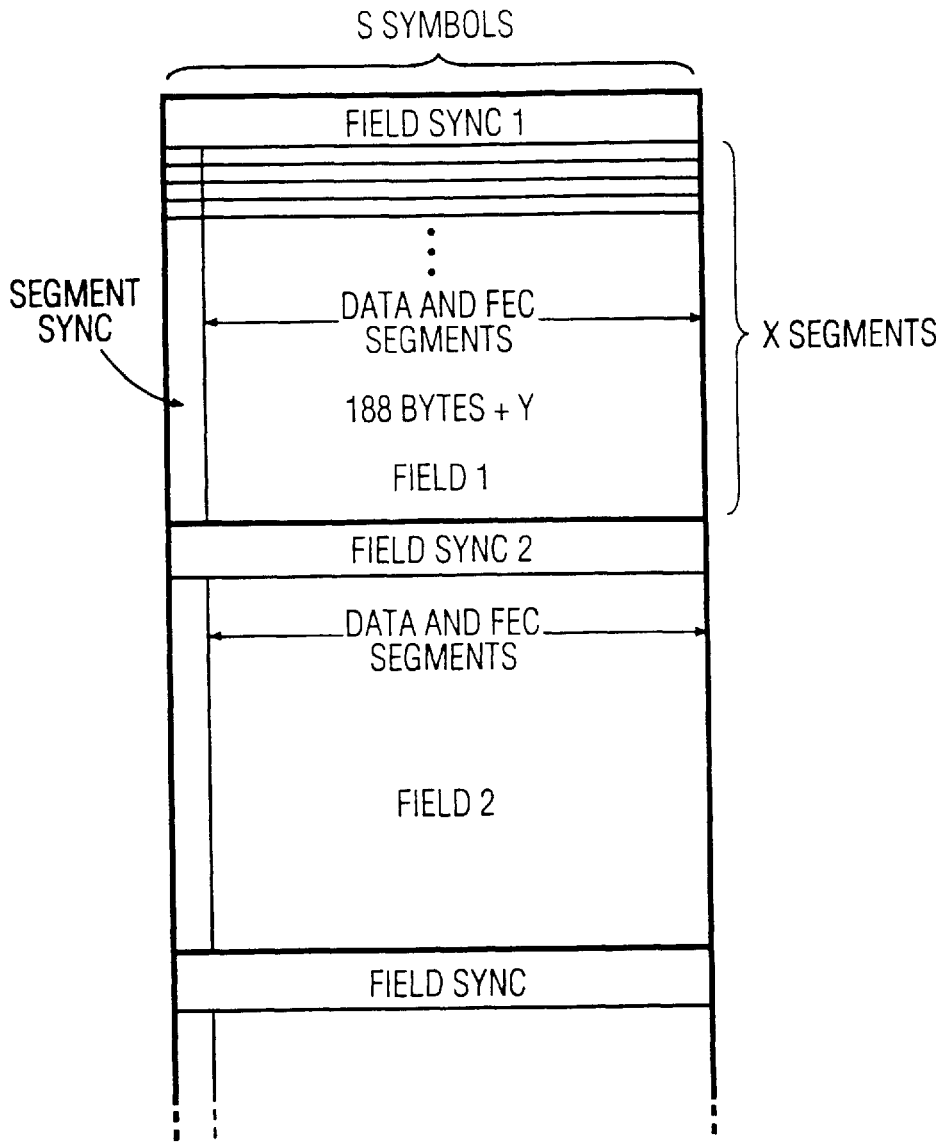
FIG. 1 illustrates one of a sequence of data field structures including synchronizing (sync) and data segments.

FIG. 1 depicts a data field structure proposed for use by the Grand Alliance HDTV system in the United States, in a system for processing a packetized datastream. An output symbol datastream representing the data field structure is produced by a transmission processor 16 in FIG. 2 in response to input data packets from a preceding transport processor 14 in FIG. 2. Details of the transmission processor will be shown and discussed in connection with FIG. 12. Each data field structure includes a field sync segment (which does not contain payload data) preceding a group of field data segments (X). Each field data segment includes an 188 byte data packet component, a segment sync component prefacing each data segment, and a forward error correction (FEC) component following the data. In this illustration "Y" designates a data disable interval between each data packet as will be shown in subsequent Figures. The transport processor provides 188 byte packets of input data to the transmission processor, which produces output segments in symbol form to be conveyed to an output transmission channel.

The data segment sync component and the field sync component facilitate packet and symbol clock acquisition and phase lock at a receiver under extreme noise and interference conditions. The 4-symbol data segment sync component is binary (2-level) in order to make packet and clock recovery rugged, and exhibits a pattern that repeats regularly at a unique rate to permit reliable detection at a receiver under noise and interference conditions. The data segment sync symbols are not Reed-Solomon or trellis coded, nor are they interleaved. The field sync component may contain pseudo-random sequences, and serves several purposes. It provides a means to determine the beginning of each data field, and may also be used by an equalizer in a receiver as a training reference signal to remove inter-symbol and other forms of interference. It also provides a means by which a receiver may determine whether or not to use an interference rejection filter, and it may be used for diagnostic purposes such as measuring signal-to-noise characteristics and channel response. The field sync component furthermore may be used by phase tracking networks in the receiver to determine phase control loop parameters. Like the segment sync component, the field sync component is not error coded, trellis coded, or interleaved. In this example the data fields do not necessarily correspond to the interlaced picture fields which comprise a picture frame of an NTSC television signal.

Figure 2:
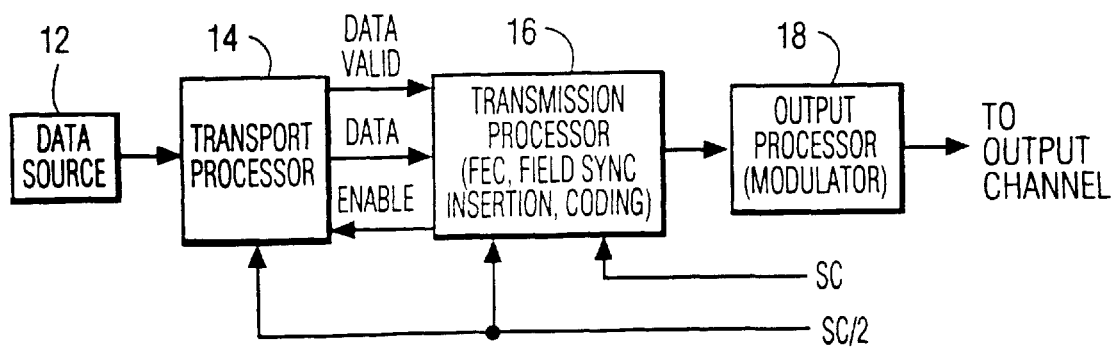
FIG. 2 is a block diagram generally illustrating apparatus for processing a packetized datastream.

FIG. 2 illustrates a general arrangement of signal processing blocks for processing the described datastream. Data source 12 provides MPEG-2 byte data to transport processor 14, which packs the MPEG bytes into fixed length data words that are eventually formed into fixed length (188 byte) data packets. Each packet is prefaced by a header that contains information denoting program source, service type and other information describing and relating to the data in the associated packet payload data, for example. Transmission processor 16, which will be discussed in detail in connection with FIG. 12, performs operations including FEC error detection/correction coding, field sync insertion, trellis coding to improve carrier-to-noise ratio, interleaving to reduce the impact of data burst transmission errors, and symbol mapping. Transmission processor 16 illustratively responds to an input bit clock SC/2 derived from an output symbol clock SC, both of which are internally generated by unit 16. Transport processor 14 also responds to the SC/2 clock. An ENABLE signal from transmission processor 16 enables processor 14 to send processor 16 a 188 byte data packet during enable intervals, and inhibits the sending of data packets during data disable intervals. An output symbol datastream from unit 16 is processed by an output unit 18 before being conveyed to an output channel. Output processor 18 includes a pilot signal insertion network, VSB modulator and Radio Frequency up-converter, as will be discussed.

FIG. 3 illustrates, in general form, the processing of one type of data field segment 20a by units 16 and 18 of FIG. 2. The segment illustrated by FIG. 3 includes a 188 byte MPEG-2 transport packet containing a one byte MPEG sync component, prefaced by a one byte segment sync component and followed by an associated FEC component containing 20 Reed-Solomon parity bytes. Each transport packet as used in the Grand Alliance HDTV system includes a 4 byte link header, the first byte of which is a sync byte which enables packet synchronization. This may be followed by an optional adaptation header, with the remainder of the packet being MPEG data payload. This example represents a proposed data field structure having 312 data field segments (X), 836 symbols (S) per segment, and a segment sync component in addition to the MPEG-2 sync component. The one byte segment sync is mapped to 4 symbols before being 2-VSB modulated. The 188 byte MPEG packet segment, with FEC coding, is ⅔ trellis coded and mapped to 832 symbols before being 8-VSB modulated. Techniques for performing such 2-VSB and 8-VSB modulation are well known. A resulting output field segment 20b conveyed to an output channel contains a 4 symbol segment sync component followed by an 832 symbol data field component containing an MPEG sync component, an MPEG data component, and an FEC component.

The arrangement of FIG. 4 is similar to that of FIG. 3 except that the input segment structure 20c is different. In FIG. 4 the segment sync component is replaced by the MPEG sync component, i.e., only one sync component is used. This results in one less byte in the 187 byte MPEG data packet. After processing, the data/FEC component of output segment 20d contains four less segment symbols (828) than in the FIG. 3 example, since only one sync component is used. In this system one byte (8 bits) corresponds to 4 symbols (2 bits per symbol).

FIG. 5 represents a proposed packetized datastream in conformance with the data field structure shown in FIG. 1, with each data field having the characteristics shown in FIG. 3, i.e., 312 data field segments and one field sync segment. More specifically, each data field segment includes 188 data bytes ("packet bytes") and 20 FEC bytes. The 188 data bytes of each segment are accompanied by 188 clock cycles, and the 20 FEC bytes of each segment are accompanied by 21 clock cycles. The 21st clock cycle accommodates the insertion of the segment sync component. When the time for inserting a field sync segment arrives, the transmission of data/FEC segments must be inhibited for a 230 clock cycle interval, which corresponds to a segment clock interval (i.e., 21+188+<clock cycles). The field sync segment does not contain a data payload as is contained in each packet data segment. This disruption of the data flow undesirably produces uneven intervals, or gaps, between packets as shown in FIG. 5. Such disrupted data flow and uneven inter-packet gaps greatly complicates the signal control and hardware requirements with respect to the interface between the transport and transmission processors (units 14 and 16 in FIG. 2), and also reduces the data throughput rate. Moreover, as noted previously, it is difficult to synchronize to the data field structure when playing back pre-recorded material. The non-uniform gaps between packets greatly complicates the task of recording the packetized datastream on studio or consumer recording equipment, since the uneven inter-packet gaps must be maintained as they occurred, i.e., the recording equipment must faithfully reproduce the MPEG packet timing. In addition, the uneven gaps must be maintained in an output signal produced be a demodulator at a receiver.

The described problems produced by the uneven packet gaps are addressed and resolved by a system in accordance with the present invention. Specifically, the inventors have recognized that in a packetized data transmission system, the problems mentioned above may be avoided by providing uniform interpacket gaps dimensioned as a function of factors including the number of segments per data field and the duration of an overhead segment to be inserted, such as the field sync segment, for example. In addition, the inventors have recognized that a datastream of packets separated by uniform gaps is advantageously facilitated by using an input bit clock frequency that is an integer sub-multiple of an output symbol clock frequency, thereby eliminating the need for phase locked loop networks. The disclosed datastream is applicable to more than one unique data field structure in terms of the number of segments per field. Advantageously, with the disclosed system, parameters such as the pilot frequency of a transmitted VSB signal, symbol rate, segment interleaving, Reed-Solomon error coding and synchronization components are unaffected. Only the number of segments per data field and the input clock frequency of the transmission system need to be controlled in accordance with the requirements of a particular system.

The frequency of the transmission processor input byte clock may be specified as the frequency of the output symbol clock (SC) divided by an even integer when the number of symbols per field segment is even. However, an odd integer may be used. The frequency of the output symbol clock is a function of the number of output symbols per data field. The number of symbol clock cycles per field (SC/field) is found by multiplying the number of symbols per segment (S) times the number of segments per field (X+1), according to the following expression:

SC/field=S(X+1).

In this expression the number "1" accounts for the field sync segment associated with each field. The number of input clock cycles per field is equal to the number of data segments per field (X), multiplied by the sum of the 188 data bytes/clock cycles per packet segment plus the number of clock cycles (Y) in the interval between packets. Thus input clock/field=X(188 +Y)

The symbol clock divided by an integer N produces the desired frequency relationship to the input byte clock for achieving the uniform interval results noted above. Thus $$\frac{SC/\text{field}}{N} = \text{input clock/field} = X(188 + Y),$$

whereby $$\frac{S(X+1)}{N} = X(188 + Y),$$

and $$Y = S/NX + [(S/N) - 188]$$

Only a few unique solutions exist where both X and Y are integers, given S symbols per segment. Two examples are shown in FIGS. 6–7, where S=836 symbols and N=2, i.e., the frequency of the input clock is a one-half sub-multiple of the frequency of the output symbol clock. In these examples even values of integer N pertain since the number of symbols S is even, but odd values of N may also be used in accordance with the requirements of a given system. The FIG. 6 and 7 examples pertain to the dual-sync segment illustrated in FIG. 3.

It is noted that the value of Y, the interval between data packet segments, is large enough to provide the interval needed for transmission processor 16 to subsequently insert the desired number of overhead FEC bytes per segment, and the overhead field sync segment per field, without interrupting the data flow as will be discussed. In FIG. 6 for example, there are 418 data segments between each field sync segment. For N=2, the input clock frequency is SC/2, one-half the frequency of output symbol clock SC. Each segment interval contains the equivalent of one extra symbol clock cycle, i.e., two extra SC/2 input clock cycles. Therefore each segment interval contains 418+1=419 cycles of input clock SC/2. Since each segment contains a fixed number of 188 data bytes and associated 188 SC/2 clock cycles, the remainder of each segment encompasses 419–188 =231 cycles of the SC/2 input clock. Specifically, each 231 clock cycle interpacket data disable interval accommodates the time needed to insert the FEC overhead information per data segment, and the field sync overhead segment between data fields. After a full field's worth of 418 data segments has been processed, 418 extra SC/2 clock cycles have been accumulated. This corresponds to 836 cycles of output symbol clock SC, which is exactly the time required to seamlessly insert the field sync segment between adjacent groups of data segments which constitute adjacent data fields. This insertion is accomplished without disrupting the datastream, as will be discussed in greater detail in connection with FIG. 12 considered with FIG. 15. In addition, certain aspects of FIGS. 6–11 will be shown and discussed in greater detail in connection with FIGS. 12 and 14.

In the illustrations that follow, a suitable symbol clock frequency was found to be 10.762237 MHz. The input clock arrangement of FIG. 6 addresses the situation where each data field contains both segment sync and MPEG sync components (as shown in FIG. 3), 836 symbols per segment, and 418 (data+FEC) segments between each field sync segment. In this example the ratio N of the transmission processor output symbol clock frequency to the input clock frequency is 2. The input clock exhibits a constant, uniform 188 clock cycles during each packet data byte interval, and exhibits a constant, uniform 231 clock cycles during each inter-packet (data disable) interval. The 231 clock cycles provide sufficient time so that, without halting the data flow, the transmission processor can insert the FEC overhead component for each segment, and the field sync overhead segment between data fields. FIG. 7 illustrates a similar constant uniform data enable/disable geometry except that 232 clock cycles occur during the intervals between data packet intervals. In FIG. 7, 209 data segments occur between each field sync segment, one-half the number of segments of the FIG. 6 example. A reduced number of 209 data segments may be used, for example, where a performance advantage may be obtained by the more frequent occurrence of the field sync component.

Figure 8:
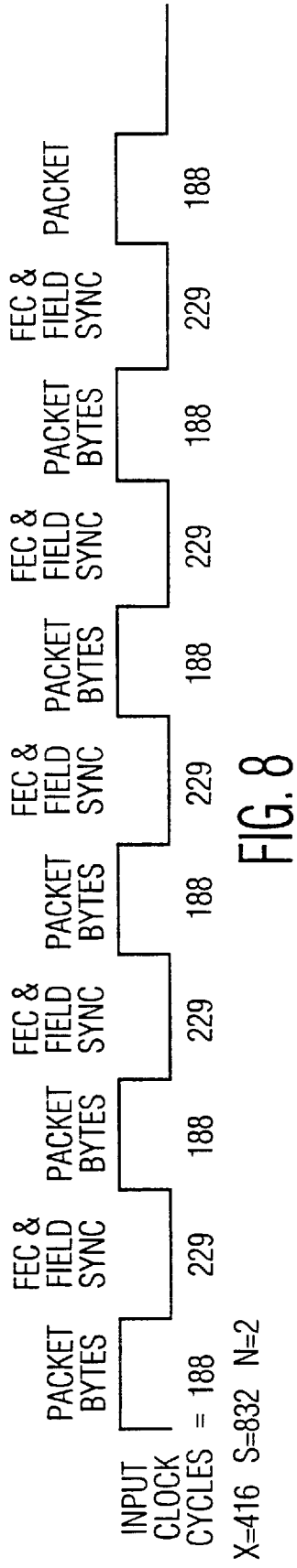
Figure 9:
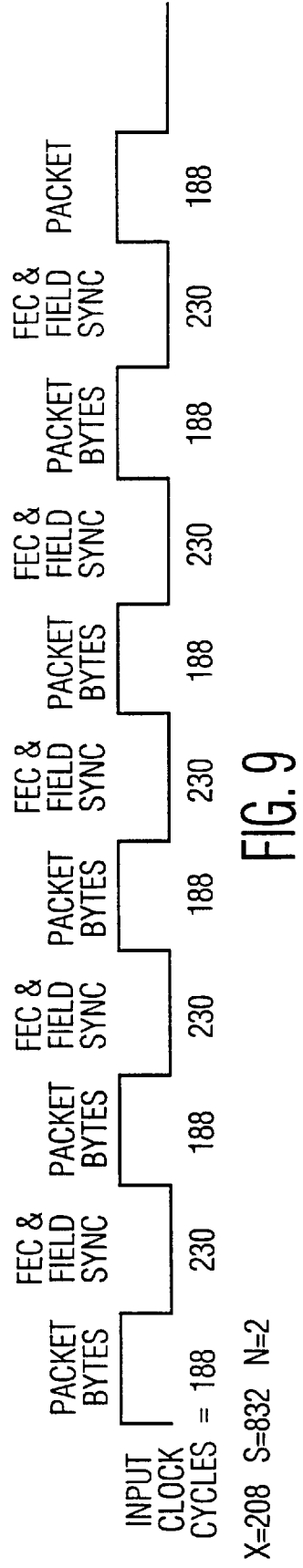

The overhead of each data segment may be reduced by using only one sync component, namely the MPEG-2 sync component, since the MPEG-2 standard specifies that each MPEG packet begins with a sync byte. This segment arrangement, with 832 symbols per segment, is shown in FIG. 4 as previously discussed. FIGS. 8 and 9 illustrate input byte clock arrangements with uniform enable/disable geometry to facilitate a non-interrupted data stream for a data field with a segment structure of the type shown in FIG. 4. FIG. 8 illustrates a preferred input byte clock arrangement for a data field with 416 data segment intervals (data+FEC) between each field sync interval. In this case 188 input byte clock cycles are associated with each 188 byte data packet, and 229 input clock cycles are associated with each interpacket data disable interval, so that at the end of each data field there is sufficient time accumulated for the transmission processor to insert the field sync segment without interrupting the data flow. This arrangement advantageously exhibits an increased data throughput rate due to the use of only one sync component. The clock arrangement of FIG. 9 is similar except that each data field contains one-half the number of data segments.

Figure 10:
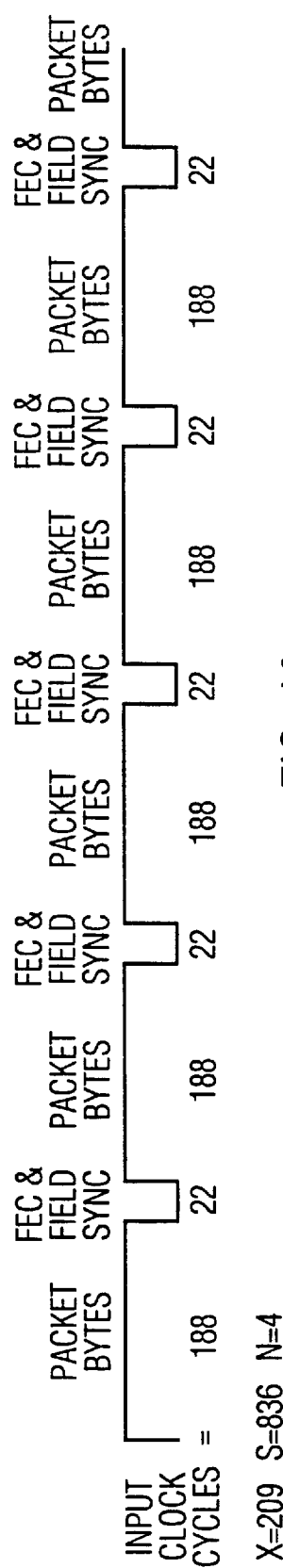
Figure 11:
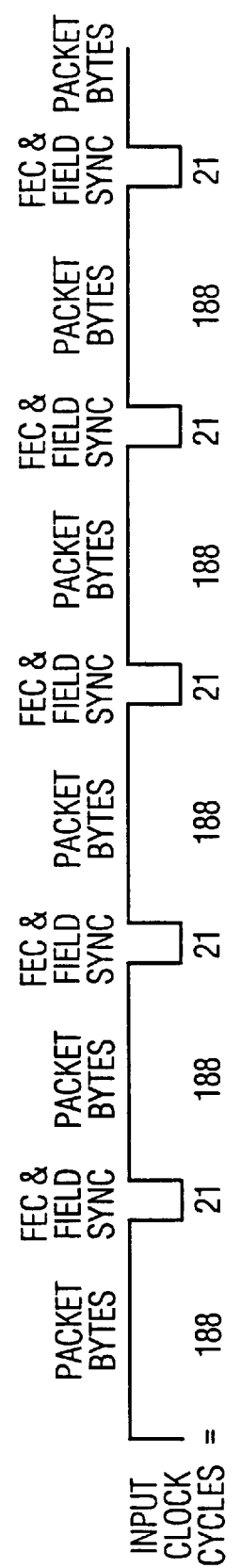

A condition where the output symbol clock and the input byte clock exhibit an integer ratio of 4 is illustrated by FIGS. 10 and 11. In the case of FIG. 10 a data field includes both segment sync and MPEG sync components (e.g., as shown in FIG. 3), 209 data segments between each field sync segment, and 836 symbols per segment. FIG. 11 pertains to a data field structure using only one sync component (e.g., as shown in FIG. 4), 208 data segments between each field sync segment, and 832 symbols per segment. A uniform data enable/disable geometry with constant uniform gaps between data packets and a continuous, uninterrupted datastream are produced in both cases, as will be seen from subsequently discussed Figures.

Figure 12:
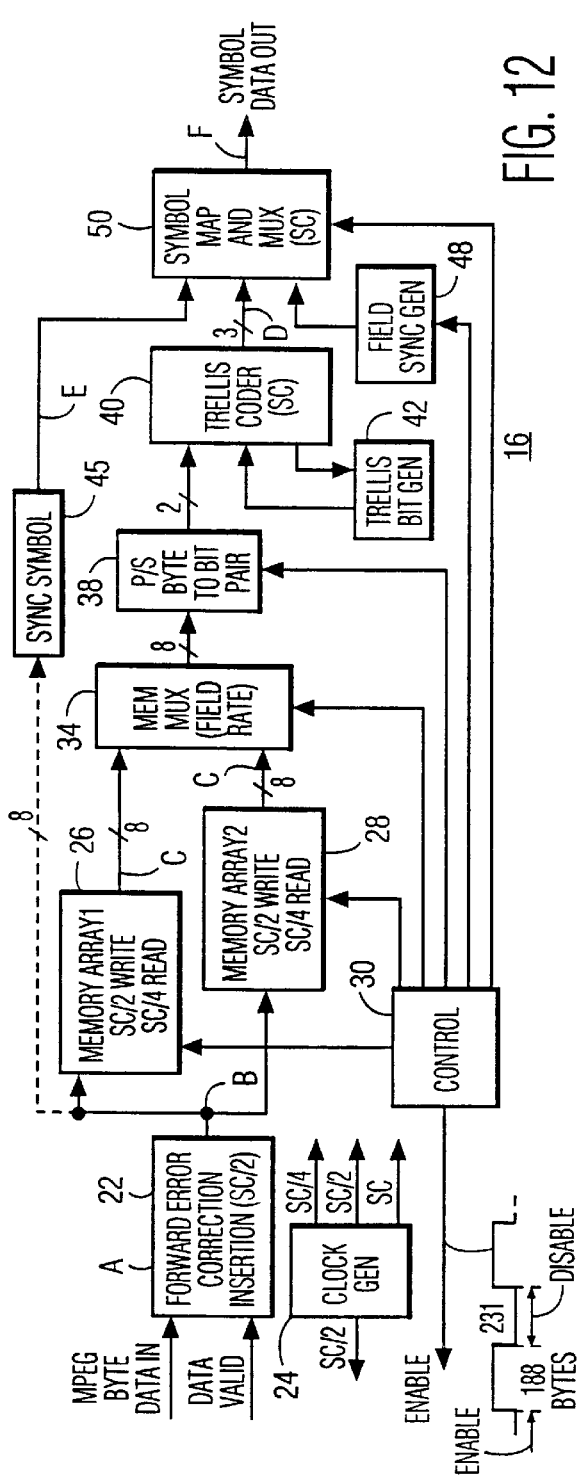
FIG. 12 is a block diagram of a transmitter encoder including a transmission processor responsive to packetized input data for providing output symbols to an output processor for transmission.

FIG. 12 shows additional details of transmission processor/encoder 16 in FIG. 2 operative with an input clock as discussed in connection with FIGS. 6 and 7, for a data field structure employing both segment sync and MPEG sync components. In this example the output symbol clock (SC) frequency is twice the input byte clock frequency (N=2), and there are 418 data segments between each field sync segment. In the following discussion, the block diagram of FIG. 12 will be considered together with data signal diagrams A–F of FIG. 15, which depict a portion of the packetized datastream at certain stages of processing.

In FIG. 12, packetized MPEG-2 byte data is provided from transport processor 14 (FIG. 2) to unit 22, which performs Forward Error Correction (FEC) processing as known. The input MPEG data contains 188 bytes per segment, including a prefacing MPEG sync byte, as illustrated by signal A in FIG. 15. The input data is clocked in using an input byte clock (SC/2) with a frequency one-half the frequency of an output symbol clock SC. Each 188 byte data segment interval is followed by an inter-packet data disable interval encompassing 231 SC/2 input clock cycles. Each segment encompasses 419 (i.e., 188 +231) intervals of SC/2 input clock cycles (corresponding in time to 838 cycles of symbol clock SC), and there are 418 data segments between field sync segments. Thus there is one more SC/2 input clock cycle in each data segment than there are data segments between field sync segments (419 vs. 418). Thus 418 additional cycles of SC/2 input clock will have accumulated after a full data field of 418 segments. The 418 additional SC/2 input clock cycles correspond to 836 additional cycles of output symbol clock SC. As will be seen, these additional 836 SC clock cycles provide exactly the time needed to subsequently clock the field sync segment into the datastream using the output symbol clock, without interrupting or otherwise disturbing the data flow.

A clock generator 24 provides the clock signals (SC, SC/2, SC/4) required by the system, including an SC/2 clock for use by transport processor 14 (FIG. 2) to maintain synchronization between tranport processor 14 and transmission processor 16. Connections of these clocks to the blocks with which they respectively operate are not shown to simplify the drawing. Control unit (e.g., a microprocessor) generates the signals necessary to create the transmission data fields of the data field structure as described above and as appears as output symbol data (signal F). Control unit additionally generates an ENABLE signal that is properly referenced to the data field structure. Input MPEG byte data for one field must be written to memory before switching the memory operating mode from write to read at the field rate. The ENABLE signal permits one packet of data to proceed from the transport processor to the transmission processor. A DATA VALID signal generated by the transport processor in response to the Enable signal permits the transport system to have a fixed number of clock cycles of delay before responding to the ENABLE signal.

The DATA VALID signal provided from transport processor 14 to FEC unit 22 enables unit 22 to read and process input data from transport processor 14. This process is assisted by the ENABLE signal from control unit , which signal informs the transport processor that the transmission processor is ready to acquire a data packet for processing. The format of input signal A (FIG. 15), with each input segment constituted by a 188 byte data enable interval followed by a data disable interval, is determined by the format of the ENABLE signal. The ENABLE signal enables an output register of the transport processor to transfer a packet during the Data Valid interval. A null packet is transferred in the absence of data in an output register of the transport processor, whereby the uniform geometry of the datastream is maintained. The DATA VALID signal is produced in response to the concurrence of the ENABLE signal and a buffer fullness signal from the output register indicating that the buffer contains a predetermined number of data bytes.

Figure 15:
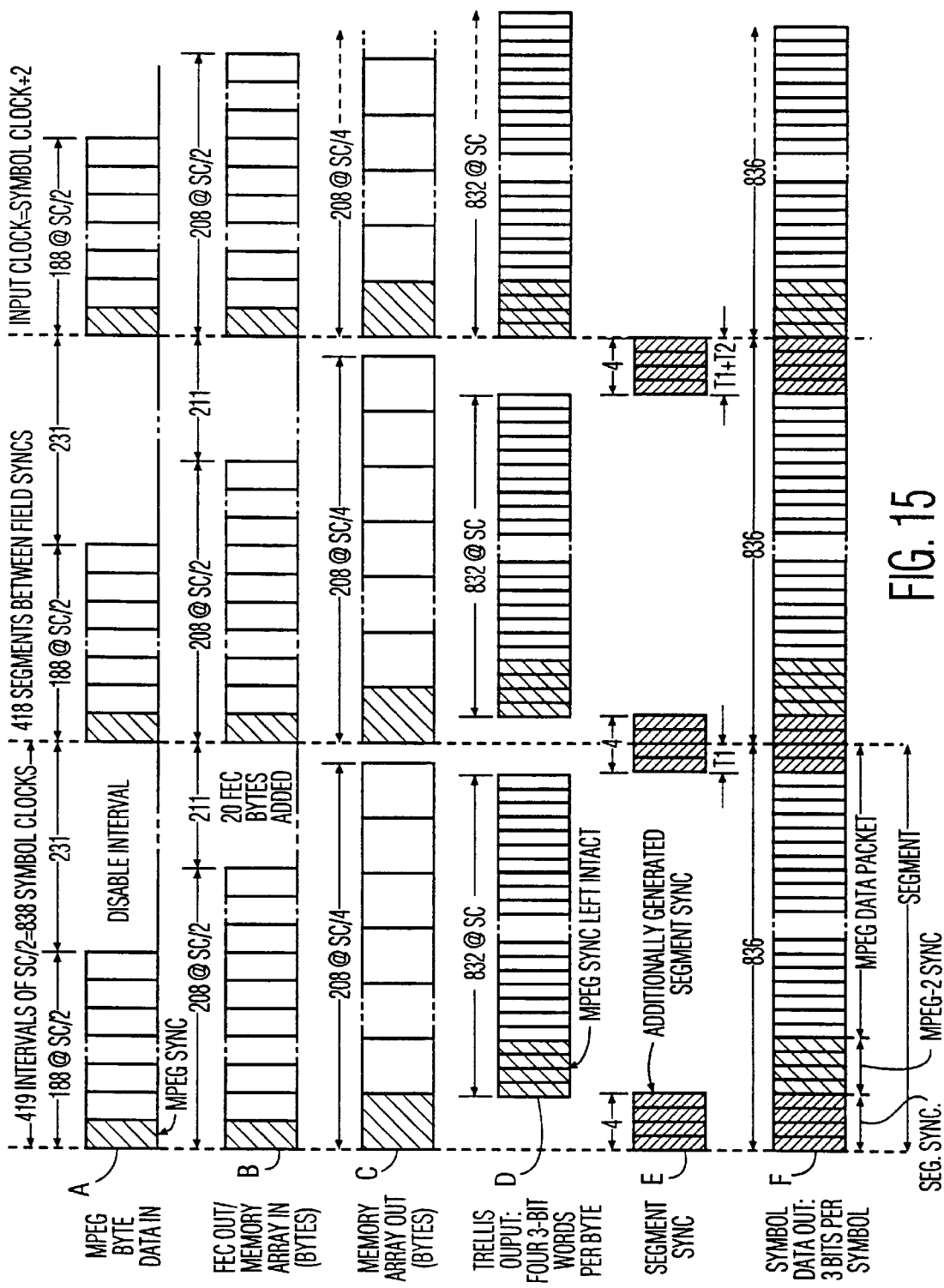
FIGS. 15 and 16 depict datastreams associated with the processing of packetized data by the system of FIG. 12.

FEC unit 22 adds 20 bytes of FEC data as depicted by signal B of FIG. 15, leaving 211 SC/2 clock cycles during the data disable interval. Signal B is concurrently applied to 6-KByte segment memories 26 and 28, each of which stores the data/FEC segments for full adjacent data fields. These units alternately write and read data in ping-pong fashion at the data field rate in response to a control signal from unit , whereby one memory writes in the data/FEC segments for one data field, while the other reads out the data/FEC segments for a prior adjacent data field, and vice-versa. Units 26 and 28 both write in response to the SC/2 input clock, read in response to an SC/4 clock, and provide 8 bit (one byte) output words. Signal B illustrates the writing in of data at SC/2, and signal C illustrates the reading out of data at SC/4, one half the write rate.

Output data/FEC segments from memories 26 and 28 are field rate time multiplexed by unit 34 into a single datastream of 8 bit (1 byte) words in response to a control signal from unit . This datastream comprises a sequence of groups of segments from successive data fields, and is applied to a parallel-to-serial data converter 38. Unit 38 converts each parallel 8 bit byte into a group of four 2 bit words, which are output serially. The data from unit 38 are ⅔ trellis coded (as known) by unit 40, which outputs 3 bits (two information bits and one derived redundancy bit) for every 2 input bits for improving signal-to-noise characteristics. These bits are provided according to a predetermined algorithm, examples of which are known in the art. Coder 40 operates in response to symbol clock SC in conjunction with unit 42, which provides the third bit in accordance with the predetermined algorithm.

The output of trellis coder 40 (signal D of FIG. 15) comprises a sequence of 3 bit trellis coded words, with four 3-bit words comprising a byte. Each data segment contains 832 symbols due to the operation of coder 40 in response to the four times faster symbol clock SC. Output unit 50, clocked by symbol clock SC, maps each 3 bit input word from coder 40 to one output symbol, and time multiplexes these symbols with a field sync component of predetermined value from unit 48 and with a four symbol segment sync component (signal E) from unit 4 to produce an output symbol datastream. In the mapping function of unit 50, eight progressively increasing numerical binary output values from unit 40, from 000, 001, 010, . . . to 111, are translated into eight symbol levels −7, −5, −3, −1, +1, +3, +7. Unit 45 normally provides a predetermined value segment sync component, which is mapped to a predetermined symbol value by unit 50. Optionally, the MPEG sync component may be used in place of the segment sync. In such case, the generation of a segment sync component by unit 4 would be inhibited, and the MPEG sync component would be removed from the output signal of FEC unit 22 and conveyed to unit 50 via unit 45, i.e., outside the main data processing path to unit 50.

Control signals for memories 26 and 28, field multiplexer 34, converter 38, field sync generator 48 and mapper/ multiplexer 50 are provided by control unit, e.g., a microprocessor. Control unit 30 provides packet read/write enable and disable signals, timing signals for controlling the ping-pong operation between memories 26 and 28, and field rate switching signals for mux 34, for example. In particular, unit controls the operation of field sync generator 48 as a function of the field rate ping-pong switching between memories 26 and 28, such that unit 48 is enabled to output field sync segment information during an interval of predetermined duration produced between adjacent data fields. This interval of predetermined duration results from processing as described and as illustrated in connection with FIGS. 15–18, whereby each field sync segment is predictably multiplexed by unit 50 into the datastream between groups of field data segments, without interrupting the flow of data.

The output symbol datastream from multiplexer 50 is illustrated by signal F in FIG. 15. Each segment of this datastream includes a uniform sequence of 836 symbols beginning with four segment sync symbols, followed by four MPEG-2 sync symbols and an MPEG data packet (including FEC bytes). Each segment of output datastream signal F is clocked by 836 symbol clock cycles. This is two symbol clock cycles less than the 838 symbol clock cycles which are equivalent to the 419 SC/2 input clock cycles of input datastream signal A. Thus each output segment requires two less symbol clock cycles (836 versus 838) compared to the corresponding input segment. These two symbol clock cycles, when accumulated over the 418 data segments that constitute a data field between field sync segments, provide exactly the additional time needed by unit 50 to clock the field sync segment into the datastream using the output symbol clock. Specifically, 836 symbol clock cycles (418×2), the same number of clock cycles used to clock each 836 symbol data segment, are available to seamlessly insert each field sync segment into the datastream without stopping the datastream.

As seen from data signal F, the output symbol datastream is a continuous stream of contiguous 836 symbol segments (only three of which are shown to simplify the drawing). Time interval T1 designates an "overlap" of two symbol clocks relative to input data signal A. Specifically, the second segment of signal F begins immediately at the end of the first segment, but two symbol clock cycles before the second segment of input datastream signal A begins. Similarly, a time interval T1+T2 designates an overlap of four symbol clocks relative to signal A. This interval includes accumulated time interval T1, plus a two clock cycle interval T2. Interval T2 results from the third segment in signal F beginning immediately at the end of the second segment, but two symbol clock cycles before the corresponding third segment of input datastream signal A begins. Additional SC clock intervals T3, T4, T5 etc. accumulate for subsequent segments until an accumulation of 836 additional symbol clock cycles results at the end of a 418 segment data field, at which time the field sync segment is inserted by unit 50 in response to symbol clock SC.

Figure 16:
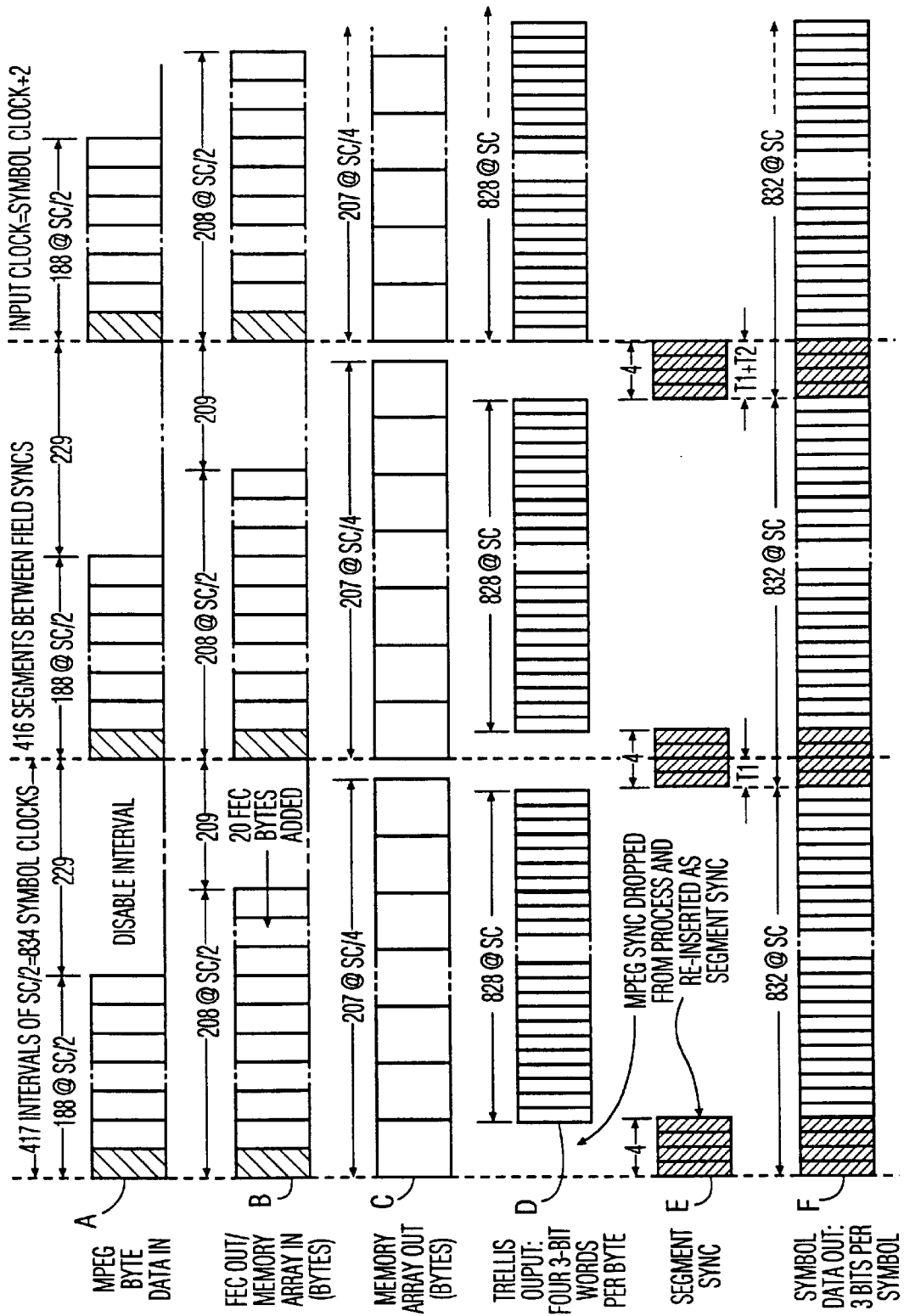

FIG. 16 depicts data signals A–F that are similar to those shown in FIG. 15, except that in FIG. 16 only one sync component is used. This alternative corresponds to that shown and discussed in connection with FIG. 6. In this example the 1 byte, 4 symbol segment sync component is not used. Instead, the MPEG-2 sync is conveyed via unit 4 outside the main processing path, and is multiplexed into the output datastream in place of the segment sync by unit 50. As can be seen by comparing signals F in FIGS. 15 and 16, with each successive segment two additional clock cycles are "saved," during intervals T1, T1+T2 etc., thereby providing the time needed to insert the field sync segment at the end of 416 frame segments, without disrupting the data stream. In this example control unit 30 provides segments that each contain 832 symbols (i.e., 416 segments×2 symbols/segment) and 832 symbol clock cycles, two less than the FIG. 15 example. Thus the use of only one sync component advantageously increases the data throughput rate.

Figure 17:
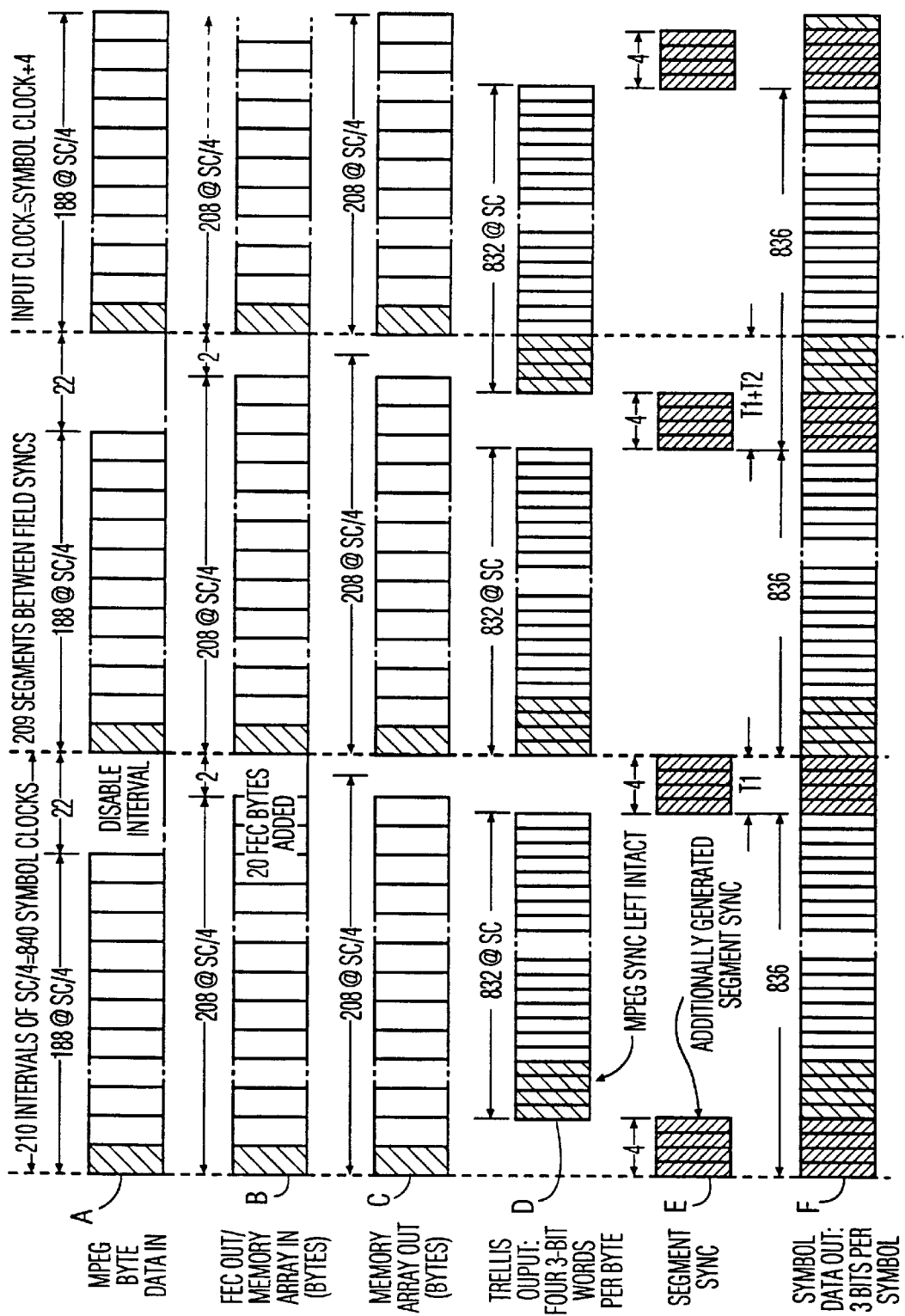
FIGS. 17 and 18 depict datastreams associated with alternative processing of packetized data by the system of FIG. 12.
Figure 18:
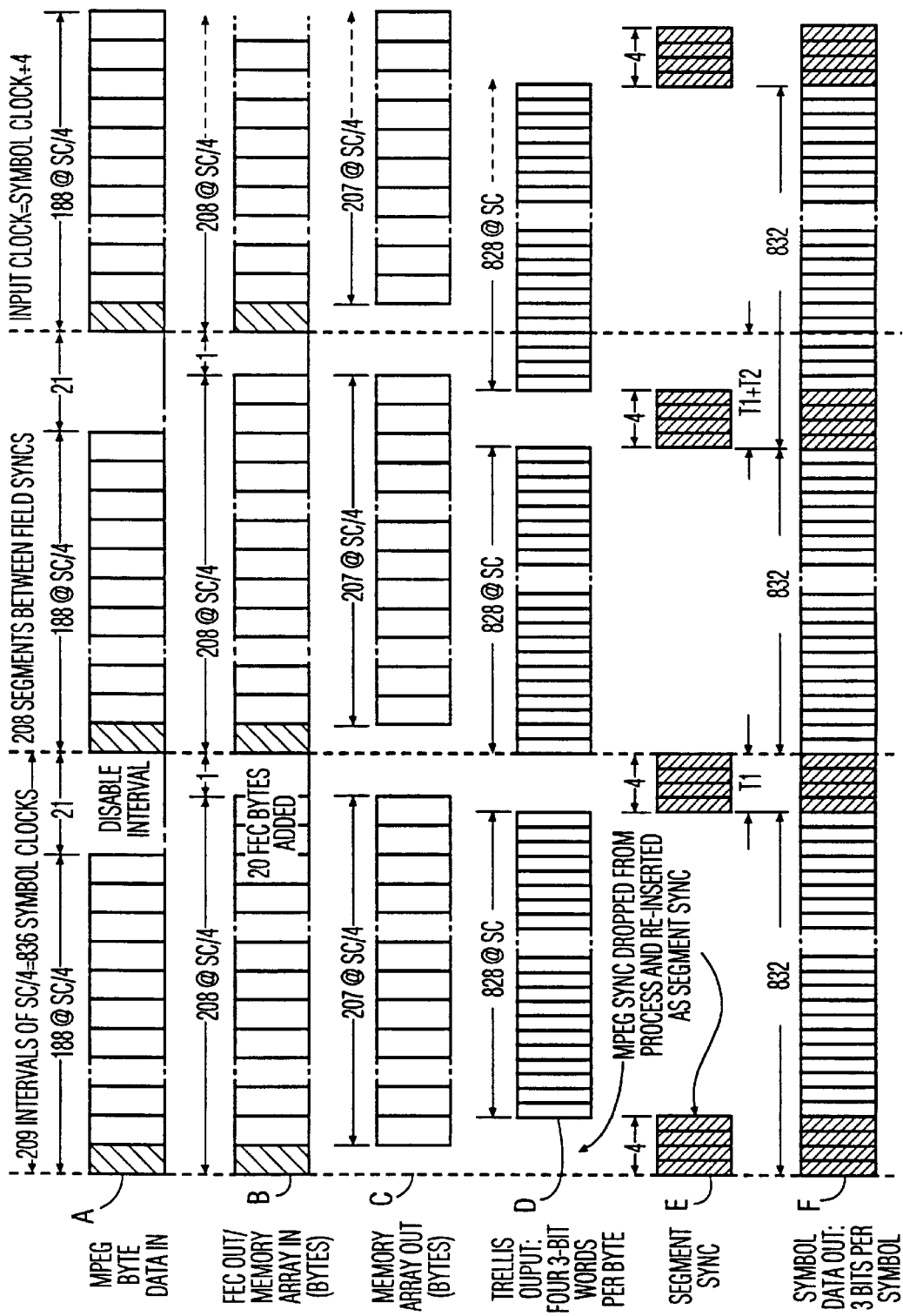

The examples of FIGS. 17 and 18 are similar to the examples of FIGS. 1 and 16, respectively, except that the integer N relating the input byte clock and the output symbol clock frequency is "4" rather than 2. Specifically, the symbol clock (SC) frequency is 4 times greater than the input clock frequency, whereby signals A, B, and C are clocked at SC/4 rather than SC/2 as in FIGS. 15 and 16, and 209 segments occur between each field sync component. In FIG. 17 both segment sync and MPEG sync components are used, and in FIG. 18 the MPEG sync is used as the segment sync.

Figure 13:
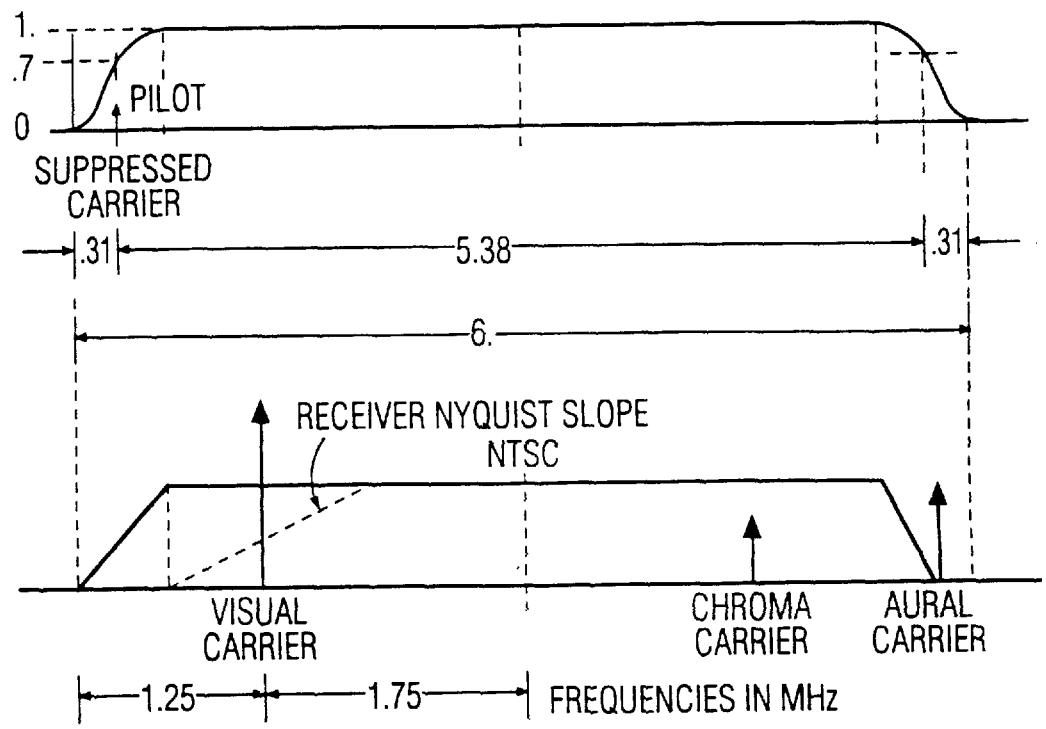
FIG. 13 illustrates a television channel spectrum that may be used to convey output data provided by the system of FIG. 12, shown in relation to a conventional NTSC television channel spectrum.

Referring again to FIG. 12, an 8-level 10.76 Msymbols/sec symbol data signal from unit 50 is provided to output processor 18 of FIG. 2, where a small pilot signal is added to a suppressed RF carrier to allow robust carrier recovery at a receiver under certain difficult reception conditions. Addition of the pilot signal is accomplished by adding a small (digital) DC level to each data and sync symbol of the baseband signal. Using known signal processing techniques, an 8-VSB modulator in output processor 18 receives the trellis coded composite data signal (with pilot), filters and spectrum shapes the signal for transmission over a standard 6 MHz television channel, modulates (upconverts) the data signal onto an Intermediate Frequency (IF) carrier, and translates the resulting signal to an RF carrier. FIG. 13 depicts, in the upper diagram, the spectrum of the baseband VSB modulation signal, relative to a standard 6 MHz NTSC channel spectrum as shown in the lower diagram.

Figure 13A:
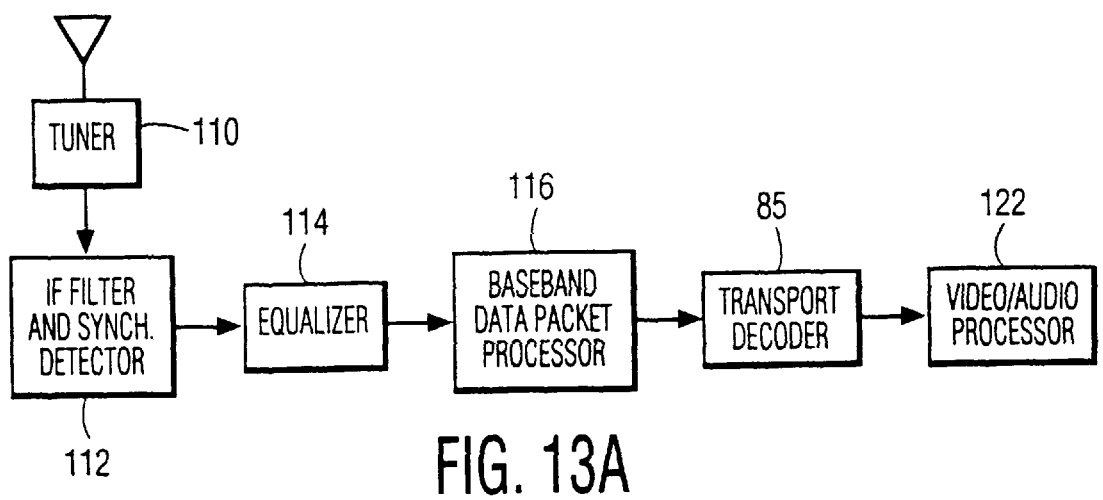
FIG. 13A is a general arrangement of receiver apparatus.

At a VSB signal receiver depicted by FIG. 13A, a received signal is processed by an RF tuner 110 including channel selection and mixer circuits to produce a frequency downconverted signal. This signal is subjected to IF filtering and synchronous detection by unit 112 to produce a baseband signal in accordance with known signal processing techniques. The baseband signal is equalized by unit 114 to compensate for transmission channel amplitude and phase perturbations, and is afterward subjected to trellis decoding, forward error detection/correction and other signal processing by a baseband data packet processor 116 in a manner which is the inverse of processing performed by the apparatus of FIG. 12 at the transmitter. Unit 116 is shown in greater detail in FIG. 14. A decoded, packetized baseband byte data signal from unit 116 is processed by a transport packet decoder 85, which basically performs the inverse of the operations performed by transport processor 14 (FIG. 2) at the transmitter. Video and audio data recovered by transport decoder 85 are respectively processed by video and audio networks in a unit 122 to provide image and sound information suitable for reproduction.

Figure 14:
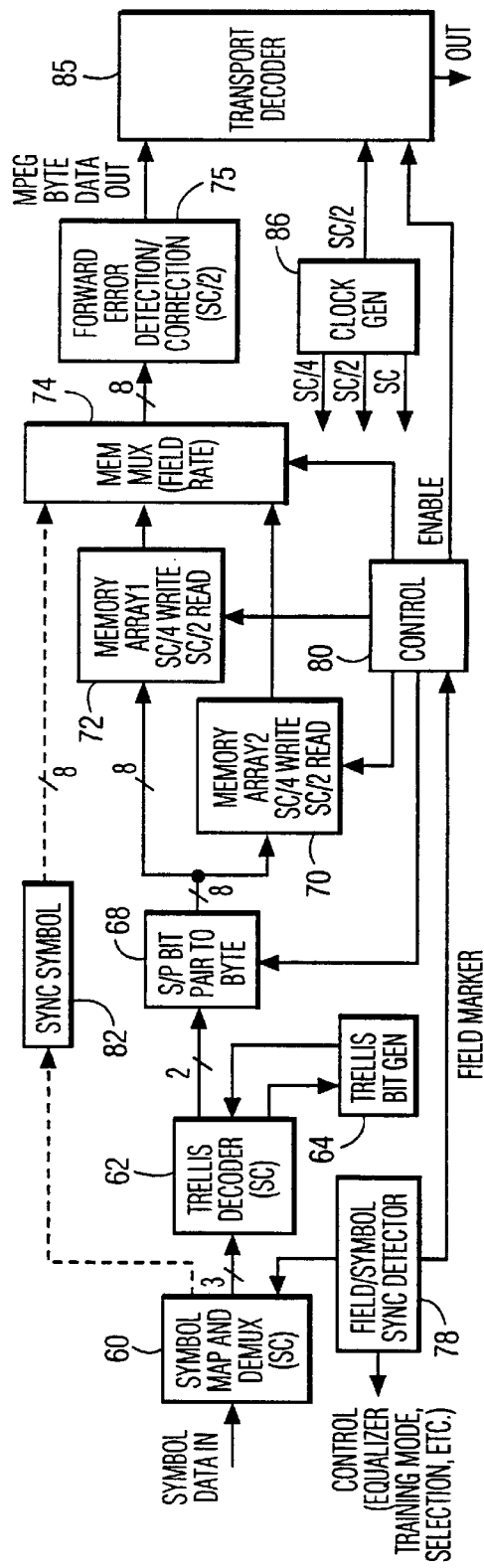
FIG. 14 is a block diagram of a receiver counterpart of the transmitter encoder system of FIG. 12.

The receiver data processing apparatus of FIG. 14 performs the same operations as the transmitter data processing apparatus of FIG. 12, but in the reverse order. Thus the output datastream of the FIG. 14 receiver system (MPEG Byte Data Out) corresponds to the input datastream of the FIG. 12 transmitter (MPEG Byte Data In).

In FIG. 14, an input symbol datastream (Symbol Data In) corresponds to the Symbol Data Out datastream developed by the apparatus of FIG. 12. This input symbol datastream contains a relatively long duration field sync component between groups of shorter duration data packets that respectively define adjacent data fields. Thus the receiver input signal exhibits a non-uniform data rate (data duration)

characteristic. As will be discussed below, this non-uniform rate input symbol datastream is converted to an MPEG Byte Data Out signal containing data packets occurring at a constant uniform rate separated by uniform interpacket data gaps. Such an output datastream advantageously facilitates data processing and data demultiplexing by transport decoder 85. As in the case of the transmitter encoder, the uniform rate output byte datastream is produced seamlessly without interrupting the datastream by employing data processing that is the inverse of the transmitter/encoder processing described in connection with FIG. 12.

A non-uniform rate baseband symbol datastream (Symbol Data In), produced after demodulation and equalization, is applied to unit 60, which responds to symbol clock SC for performing the inverse of the operations performed by unit 50 in FIG. 12. Symbol clock SC is identical to symbol clock SC at the transmitter. An output symbol datastream produced by unit 60 is monitored by unit 78 to detect the appearance of control information present during field sync intervals, e.g., so-called "training" signal information for use by the preceding equalizer (unit 114 in FIG. 13A), and mode selection information, among other information. This information is extracted by unit 78 and conveyed to preceding circuits in accordance with the requirements of a particular system. Unit 78 also provides a field marker signal to control unit 80 for establishing field rate timing operations as will be discussed.

Unit 60 maps each 3 bit symbol to a 3 bit word which is trellis decoded to a 2 bit word by decoder 62 in conjunction with unit 64. Groups of four 2 bit data words are converted from serial form to 8 bit (1 byte) parallel form by serial-to-parallel converter 68. Serial words from converter 68 are applied to ping-pong segment memories 70 and 72. These memories operate essentially the same as segment memories 26 and 28 in FIG. 12, except with read and write clocks reversed, i.e., the read and write clocks for memories 70 and 72 correspond to the write and read clocks of memories 26 and 28 in FIG. 12. Data field segments stored in memories 70 and 72 are time multiplexed at the field rate by time multiplexer 74. The Field Marker signal provided by unit 78 to control signal generator 80 establishes the field rate timing of read/write control signals provided by unit 80 to memories 70, 72, and the timing operation of multiplexer 74. The Field Marker signal also instructs controller 80 not to write the field sync segment to memories 70 and 72, whereby a resulting output datastream is devoid of the field sync component.

Unit 74 multiplexes output data packets from memories 70 and 72 into a single datastream that is devoid of the field sync component, whereby the datastream (MPEG Byte Data Out) from units 74 and 7 exhibits a constant, uniform data rate and constant, uniform inter-packet gaps. Specifically, the MPEG Byte Data Out datastream in the receiver of FIG. 14 is similar to the MPEG Byte Data In datastream at the input of the FIG. 12 transmitter system. This results from the characteristics of the receiver input symbol datastream as discussed in connection with FIGS. 12 and 15–18, together with the output byte clock (SC/2) being an integer submultiple of the input symbol clock (SC). This is the inverse of the relationship between the input and output clocks at the transmitter/encoder. However, at both the transmitter and the receiver the byte clock (SC/2) is an integer sub-multiple of the symbol clock (SC). The process of developing the constant, uniform rate datastream is assisted by the choice of the read/write clock frequencies of memories 70 and 72 together with the field rate multiplexing provided by unit 74. Unit 74 also optionally multiplexes a sync symbol component, derived from unit 60 and conveyed by unit 82, into the datastream.

The MPEG packets including the MPEG sync component are reconstructed at the receiver, prior to transport processor 85. An MPEG sync component must be replaced in the datastream if it had been previously removed, and a segment sync component must be removed if it had been previously inserted into the datastream. These operations are performed by sync symbol detector and generator 82 in cooperation with multiplexer 74. Unit 82 senses the absence of an MPEG sync component and generates such component as needed, and unit 74 multiplexes this sync component into the datastream. Unit 82 also detects the presence of a segment sync component and causes it to be removed from the datastream.

Control signal generator 80 also provides an ENABLE signal which enables transport decoder/processor 85 to receive and process the constant, uniform rate MPEG byte data packets from Forward Error Correction unit 75, e.g., a Reed-Solomon decoder. Transport decoder 85 provides the inverse of the functions provided by transport processor 14 at the transmitter (FIG. 2), and responds to a byte clock SC/2 at half the frequency of the symbol clock provided by clock generator 86. Transport processor 85 includes various data processing and demultiplexing circuits including header analysers, signal routers responsive to header information, MPEG decompression networks and other image and audio data processors which provide signals that are formatted as required by video/audio processor 122 in FIG. 13A.

Although in the disclosed preferred embodiments the input byte clock and the output symbol clock exhibited an integer frequency relationship, a non-integer frequency may also be used. This would be a less desireable alternative in most cases, however, because it would require the use of phase locked loop networks, which would add to the cost and complexity of the system.

We claim:

1. A system (FIG. 12) for processing a packetized digital datastream (MPEG Byte Data In) to produce an output datastream (Symbol Data Out) representing sequential datafield structures each containing data and overhead information, said system comprising:

input means (14, 24, 30) for providing a datastream of data packets separated by inter-packet data gaps;

means (48) for providing a field overhead information segment (Field Sync) having a duration different than the duration of inter-packet gaps within a data field; and processing means (16, 50) responsive to said datastream from said input means and to said field overhead segment for producing an output datastream (Symbol Data Out) representing a sequence of datafield structures (FIG. 1) each comprising a field overhead segment and a data field containing a group of data segments (X); wherein said input means provides said datastream with predetermined constant uniform inter-packet gaps over a plurality of said datafield structures, said uniform inter-packet gaps being dimensioned to facilitate the insertion of overhead information.

2. A system according to claim 1, wherein
   said input means provides said datastream with a constant uniform data rate.

3. A system according to claim 1, wherein
   said field overhead segment has a duration greater than the duration of said inter-packet gaps; and
   said processing means produces said output datastream, including said field overhead segment, without interrupting said datastream.

4. A system according to claim 1, wherein
said constant uniform inter-packet gaps is a function of said duration of said field overhead segment and the number of said data segments constituting a data field structure.

5. A system according to claim 1, wherein
each group of data segments comprises a predetermined number of data segments of predetermined duration; and
each uniform inter-packet gap of a data field encompasses an interval including a prescribed portion of an interval occupied by associated field overhead segment.

6. A system according to claim 5, wherein
each uniform inter-packet gap of a data field encompasses substantially equal amounts of an associated field overhead segment interval, so that an interval substantially equal to said associated field overhead segment interval accumulates after each group of data segments comprising said associated data field.

7. A system according to claim 1, wherein
said field overhead segment contains field synchronizing information; and
said processing means additionally includes means for adding a packet overhead component to said data segments respectively.

8. A system according to claim 7, wherein
said processing means adds said field overhead segment to said datastream without interrupting said datastream.

9. A system according to claim 1, wherein
said processing means includes an input circuit responsive to an input clock and an output circuit responsive to an output clock; and
said input and output clocks exhibit integer related frequencies.

10. A system according to claim 9, wherein
said integer is an even integer.

11. A system according to claim 10, wherein
said input clock frequency is an even sub-multiple of said output clock frequency.

12. A system according to claim 9, wherein
said input clock is a byte clock and said output clock is a symbol clock.

13. In a system (FIG. 14) for receiving a digital datastream (Symbol Data In) representing a sequence of datafield structures (FIG. 1) each including a group of field data segments (X) and a field overhead segment (Field Sync) containing data different from data contained in said data segments, apparatus comprising
input means (114, FIG. 13A) for providing said datastream (Symbol Data In);
processing means (116 in FIG. 13A; 68–80 in FIG. 14), including means (48) for removing said overhead information from said datastream, responsive to said datastream for producing a processed packetized datastream (MPEG Byte Data Out) devoid of said overhead information and comprising data packets with constant uniform inter-packet gaps and a constant uniform data rate; and
decoder means (85) responsive to said processed uniform data rate datastream for decoding said processed datastream into constituent signal components.

14. A system according to claim 13, wherein
each said data segment contains data and segment overhead information; and
said field overhead segment exhibits a duration different than the duration of said segment overhead information.

15. A system according to claim 13, wherein
said processing means produces said processed datastream without interrupting said datastream.

16. A system according to claim 13, wherein
said constant uniform inter-packet data gaps are a function of said duration of said overhead information and the number of said data segments constituting a data field.

17. A system according to claim 13, wherein
each group of data segments comprises a predetermined number of data segments of predetermined duration; and
each inter-packet gap of said processed datastream encompasses an interval including a prescribed portion of an interval occupied by associated overhead information.

18. A system according to claim 17, wherein
each inter-packet gap of said processed datastream encompasses substantially equal amounts of an associated overhead information interval.

19. A system according to claim 13, wherein
said overhead information is field synchronizing information contained in a field sync segment.

20. A system according to claim 13, wherein
said processing means includes an input circuit (60) responsive to an input clock (SC) and an output circuit (75) responsive to an output clock (SC/2); and
said input and output clocks exhibit integer related frequencies.

21. A system according to claim 20, wherein
said integer is an even integer.

22. A system according to claim 21, wherein
said output clock frequency (SC/2) is an even sub-multiple of said input clock frequency (SC).

23. A system according to claim 20, wherein
said input clock is a symbol clock and said output clock is a byte clock.

24. A system according to claim 13, wherein said processing means includes
a first memory (70) responsive to said datastream and to a write clock (SC/4) and to a read clock (SC/2);
a second memory (72) responsive to said datastream and to a write clock (SC/4) and to a read clock (SC/2);
means (80) for providing read/write control of said first and second memories at a field rate; and
means (74) for combining output data from said first and second memories.

25. A system according to claim 24, wherein
said write clock exhibits a frequency that is an integer sub-multiple of the frequency of said read clock.

26. A system according to claim 24, wherein
said combiner is a time multiplexer.

27. A system according to claim 24 and further comprising
means (62) for decoding data provided to said first and second memories; and
error detecting and correcting means (75) responsive to output data from said combining means.

28. In a system (FIG. 14) for receiving a continuous digital datastream (Symbol Data In) of contiguous data segments representing a sequence of datafield structures (FIG. 1), each datafield structure including a group of field data segments (X) with associated segment overhead information (FEC) and a field overhead segment (Field Sync), wherein (a) said data segments and said field overhead segment are of equal duration (188 Bytes), (b) said field overhead segment contains data different from data contained in said data segments, and (c) field overhead segment exhibits a duration different than the duration of said segment overhead information; apparatus comprising input means (114, FIG. 13A) for providing said datastream (Symbol Data In);

processing means (116 in FIG. 13A; 60–80 in FIG. 14) responsive to said datastream for producing a processed packetized datastream (MPEG Byte Data Out) devoid of said overhead information and comprising data packets with constant uniform inter-packet gaps and a constant uniform data rate, without interrupting said datastream;

decoder means (85) responsive to said processed uniform data rate datastream for decoding said processed datastream into constituent signal components; and video processor means (122) responsive to output signals from said decoder means.

29. A system according to claim 28, wherein said segment overhead information includes error processing information; and said field overhead information includes field synchronizing information.

30. A system according to claim 28, wherein said input means comprises baseband signal processing means (114); and said processing means comprises a trellis decoder (62) for producing a decoded signal; and error processing means (75) responsive to said decoded signal in the form of said processed datastream with uniform inter-packet gaps.

31. A system according to claim , wherein said received datastream is a symbol datastream; and said processed packetized datastream is a byte datastream.

32. A system according to claim 28 and further comprising sync component processing means (82, 74) for causing said processed datastream to exhibit a predetermined synchronizing (sync) information configuration.

33. A system according to claim 32, wherein said received datastream contains MPEG information;

said received datastream includes a segment sync component associated with each said field data segment; and said processed datastream contains an MPEG sync component and is devoid of said segment sync component.

* * * * *